(12) United States Patent
Jiang et al.

(10) Patent No.: US 8,758,540 B2
(45) Date of Patent: Jun. 24, 2014

(54) METHOD FOR LAYING CARBON NANOTUBE FILM

(71) Applicants: Kai-Li Jiang, Beijing (CN); Chen Feng, Beijing (CN); Lin Xiao, Beijing (CN); Zhuo Chen, Beijing (CN); Liang Liu, Beijing (CN); Shou-Shan Fan, Beijing (CN); Qun-Qing Li, Beijing (CN); Li Qian, Beijing (CN); Yang Wei, Beijing (CN)

(72) Inventors: Kai-Li Jiang, Beijing (CN); Chen Feng, Beijing (CN); Lin Xiao, Beijing (CN); Zhuo Chen, Beijing (CN); Liang Liu, Beijing (CN); Shou-Shan Fan, Beijing (CN); Qun-Qing Li, Beijing (CN); Li Qian, Beijing (CN); Yang Wei, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/662,704

(22) Filed: Oct. 29, 2012

(65) Prior Publication Data

US 2013/0062001 A1    Mar. 14, 2013

Related U.S. Application Data

(63) Continuation-in-part of application No. 12/583,429, filed on Aug. 20, 2009.

(30) Foreign Application Priority Data

Nov. 14, 2008   (CN) .......................... 2008 1 0217814

(51) Int. Cl.
  B32B 37/00   (2006.01)
  B29C 45/00   (2006.01)
  B28B 11/08   (2006.01)

(52) U.S. Cl.
  USPC ...... 156/229; 156/496; 264/291; 264/172.19; 264/238

(58) Field of Classification Search
  USPC .............. 264/291, 172.19, 238, 292, 82; 423/461, 447.1, 447.2, 447.3; 118/729, 118/718; 427/350, 220, 447.2; 428/364, 428/367, 375, 379, 389, 408; 156/495, 229, 156/447
  See application file for complete search history.

(56) References Cited

U.S. PATENT DOCUMENTS

2008/0018012 A1 * 1/2008 Lemaire et al. ................ 264/82
2009/0028779 A1    1/2009 Wang et al.

FOREIGN PATENT DOCUMENTS

TW         I337172       2/2011
WO    WO 2007015710 A2 *  2/2007
WO    WO2007119747      10/2007

* cited by examiner

*Primary Examiner* — Philip Tucker
*Assistant Examiner* — Alex Efta
(74) *Attorney, Agent, or Firm* — Novak Druce Connolly Bove + Quigg LLP

(57) ABSTRACT

A method for laying carbon nanotube film includes following steps. A carbon nanotube film is provided. The carbon nanotube film includes a number of carbon nanotube strings substantially parallel to each other and extending along a first direction. The carbon nanotube film is stretched along a second direction substantially perpendicular with the first direction to form a deformation along the second direction. The carbon nanotube film is placed on a surface of a substrate. The deformation along the second direction is kept.

16 Claims, 10 Drawing Sheets

METHOD FOR LAYING CARBON NANOTUBE FILM

RELATED APPLICATIONS

This application is a continuation application in part of U.S. patent application Ser. No. 12/583,429, filed on Aug. 20, 2009, and entitled, "METHOD FOR STRETCHING CARBON NANOTUBE FILM," which claims all benefits accruing under 35 U.S.C. §119 from China Patent Application No. 200810217814.5, filed on Nov. 14, 2008 in the China Intellectual Property Office.

BACKGROUND

1. Technical Field

The present disclosure relates to nanomaterial films and methods for stretching the same and, particularly, to a carbon nanotube film and a method for stretching the same.

2. Discussion of Related Art

Carbon nanotubes have received a great deal of interest since the early 1990s. Carbon nanotubes have interesting and potentially useful electrical and mechanical properties. Due to these and other properties, carbon nanotubes have become a significant focus of research and development for use in electron emitting devices, sensors, and transistors.

Generally, carbon nanotubes prepared by conventional methods are in particle or powder form. The particle or powder-shaped carbon nanotubes limit the applications the carbon nanotubes can be used. Thus, preparation of macro-scale carbon nanotube structures has attracted lots of attention.

Carbon nanotube yarn is one important macro-scale carbon nanotube structure. Examples of a method for making a carbon nanotube yarn is taught by U.S. Pat. No. 7,045,108 to Jiang et al. The carbon nanotube yarn is directly drawn from a super-aligned carbon nanotube array. The carbon nanotube yarn includes a plurality of carbon nanotubes joined end-to-end by van der Waals attractive forces therebetween. Specifically, the carbon nanotube yarn includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. The length of the carbon nanotube yarn can vary. However, the width of the carbon nanotube yarn is related to a size of the carbon nanotube array.

Carbon nanotube film is another important macro-scale carbon nanotube structure. Examples of a method for making the carbon nanotube film is taught by US patent application 2008/0170982 to Zhang et al. The carbon nanotube film also can be prepared by drawing from a carbon nanotube array. The length of the carbon nanotube film is not limited. However, both the width of the carbon nanotube film and the carbon nanotube yarn are restricted by a size of the carbon nanotube array. Nowadays, the size of carbon nanotube arrays is limited to about 4 inches, which is not conducive to preparing carbon nanotube films with large area.

What is needed, therefore, is a carbon nanotube film without limit in size and a method for stretching the same.

BRIEF DESCRIPTION OF THE DRAWINGS

Many aspects of the present carbon nanotube film and method for stretching the same can be better understood with references to the following drawings. The components in the drawings are not necessarily drawn to scale, the emphasis instead being placed upon clearly illustrating the principles of the present carbon nanotube film and method for stretching the same.

Figure 1:
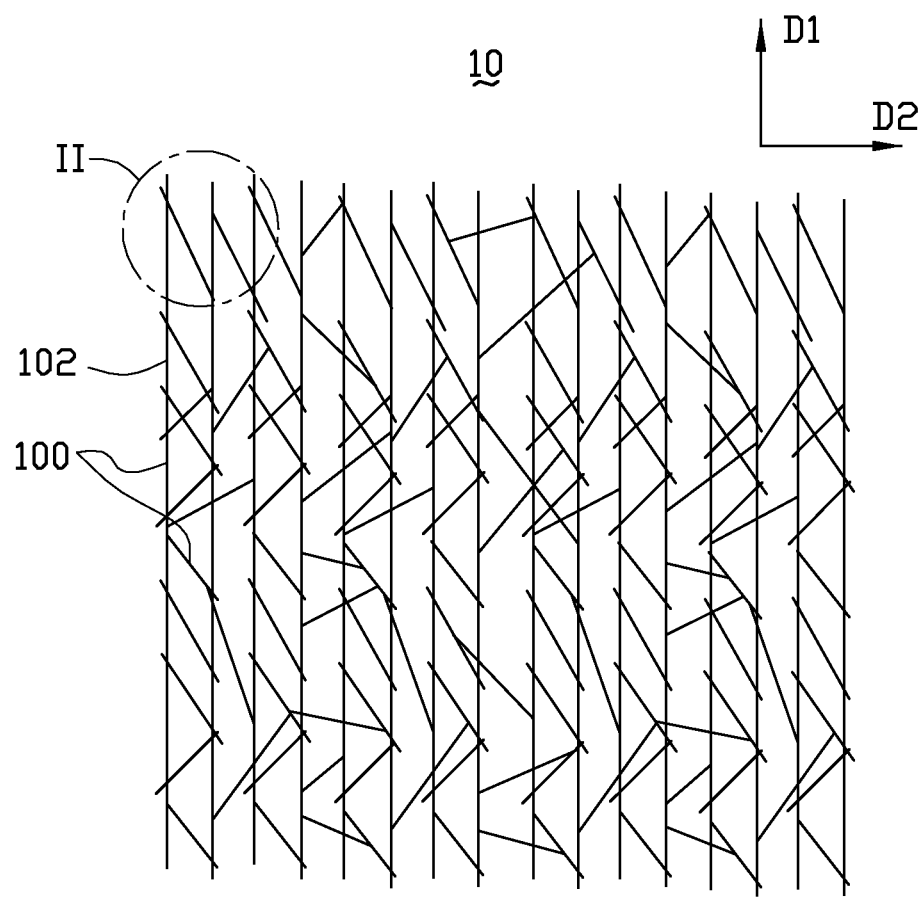
FIG. 1 is a schematic view of one embodiment of a carbon nanotube film.
Figure 2:
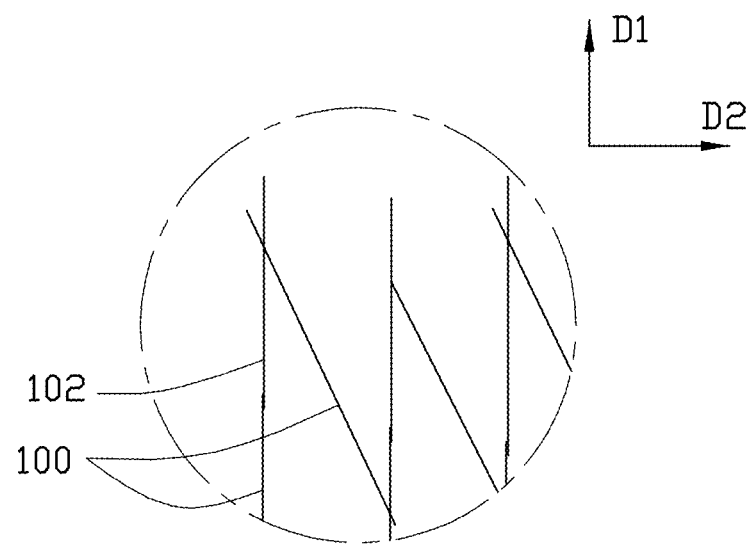
FIG. 2 is a schematic view of part of the carbon nanotube film of FIG. 1.

Corresponding reference characters indicate corresponding parts throughout the several views. The exemplifications set out herein illustrate at least one embodiment of the present carbon nanotube film and method for stretching the same, in at least one form, and such exemplifications are not to be construed as limiting the scope of the disclosure in any manner

DETAILED DESCRIPTION

References will now be made to the drawings to describe, in detail, embodiments of the present carbon nanotube film and method for stretching the same.

Referring to FIG. 1 through FIG. 4, one embodiment of a carbon nanotube film 10 includes a plurality of carbon nanotubes 100. A part of the carbon nanotubes 100 are joined end to end to form a plurality of carbon nanotube strings 102. Each carbon nanotube string 102 includes a plurality of carbon nanotubes 100 joined end to end. The carbon nanotubes 100 in the carbon nanotube string 102 are substantially aligned along an axis of the carbon nanotube string 102, and attracted by van der Waals attractive force therebetween. The carbon nanotube film 10 can include a plurality of carbon nanotube strings 102 located side by side. The carbon nanotube strings 102 are attracted by van der Waals attractive force therebetween. The carbon nanotube strings 102 can be separated from each other. The carbon nanotube strings 102 are uniformly distributed in the carbon nanotube film 10 and substantially arranged along a first direction D1. There are one or more carbon nanotubes 100 located between adjacent carbon nanotube strings 102. The orientation of the one or more carbon nanotubes 100 located between adjacent carbon nanotube strings 102 is such that the one or more carbon nanotubes 100 located between adjacent carbon nanotube strings 102 contacts with at least two adjacent carbon nanotube strings 102 via van der Waals attractive force therebetween. In one embodiment, most of the carbon nanotubes 100, located between adjacent carbon nanotube strings 102, contact with at least two carbon nanotube strings 102 located side by side. The carbon nanotubes 100 located between adjacent carbon nanotube strings 102, can also be joined end to end. There is a certain distance between adjacent carbon nanotube strings 102. The distance between adjacent carbon nanotube strings 102 can be altered if a sufficient force is applied.

The carbon nanotube strings 102 and the carbon nanotubes 100 between the adjacent carbon nanotube strings 102 form a grid like structure, thereby forming a carbon nanotube film 10 having a free-standing structure. The carbon nanotube film 10 having a free-standing structure means that the carbon nanotube film 10 can maintain a film structure if part of the carbon nanotube film 10 is located on a supporter and the structure of the carbon nanotube film 10 will not change. For example, when the carbon nanotube film 10 is placed on a frame or two separate supporters, part of the carbon nanotube film 10 which is not in contact with the frame or two separate supporting elements would be suspended between parts of the frame or between two supporters and yet will maintain film structure integrity.

The carbon nanotube film 10 can be stretched along a second direction D2. The second direction D2 is substantially perpendicular to the first direction D1. If the carbon nanotube film 10 is stretched along the second direction D2, the carbon nanotube film 10 is accordingly deformed along the second direction D2, thus, the distance between adjacent carbon nanotube strings 102 is changed. Specifically, the distance between adjacent carbon nanotube strings 102 is increased with increased deformation of the carbon nanotube film 10 along the second direction D2. The deformation of the carbon nanotube film 10 along the second direction D2 can reach up to about 300% (e.g., the carbon nanotube film 10 can be stretched to about 300% of its original size). In the present embodiment, a distance between the adjacent carbon nanotube strings 102 located side by side can range from about 0 micrometers to about 50 micrometers. It can be understood that some of the plurality of carbon nanotube strings 102 can form a carbon nanotube bundle.

A length and a thickness of the carbon nanotube film 10 can be varied. The width of the carbon nanotube film 10 is related to the size of a carbon nanotube array, the carbon nanotube film being drawn from the carbon nanotube array. A thickness of the carbon nanotube film 10 can be in a range from about 0.5 nanometers to about 1 millimeter. A diameter of the carbon nanotubes 100 in the carbon nanotube film 10 can be in a range from about 0.5 nanometers to about 50 nanometers. A length of the carbon nanotubes 100 in the carbon nanotube film 10 can be in a range from about 50 micrometers to about 5 millimeters.

The deformation of the carbon nanotube film 10 along the second direction D2 is related to the thickness and the density of the carbon nanotube film 10. The greater the thickness and the density of the carbon nanotube film 10, the larger the deformation of the carbon nanotube film 10 along the second direction D2. Further, the deformation of the carbon nanotube film 10 can also be related to the number of the carbon nanotubes 100 between the carbon nanotube strings 102. Among a range of a mass ratio of the carbon nanotubes 100 between the carbon nanotube strings 102 to the carbon nanotube film 10, the greater the number of the carbon nanotubes 100 between the carbon nanotube strings 102, the greater the deformation of the carbon nanotube film 10 along the second direction D2. In one embodiment, the range of a mass ratio of the carbon nanotubes 100 between the carbon nanotube strings 102 to the carbon nanotube film 10 is about 14% to about 33%. The deformation of the carbon nanotube film 10 along the second direction D2 can reach up to about 300%. Electrical resistance of the carbon nanotube film 10 before and after being stretched is almost the same. In the present embodiment, a thickness of the carbon nanotube film 10 is about 50 nanometers, and the deformation of the carbon nanotube film 10 along the second direction D2 can be up to 150%.

Figure 7:
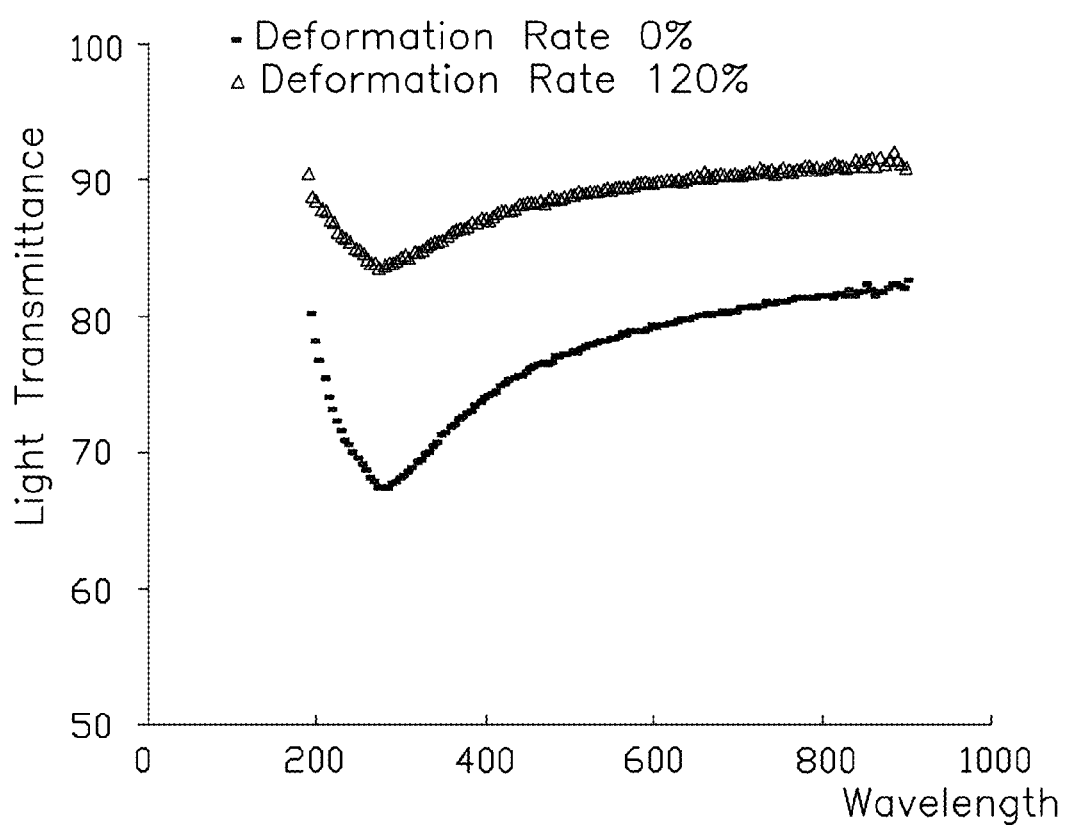
FIG. 7 is a schematic view of the light transmittance of the carbon nanotube film before and after being stretched.

A light transmittance (transmitting ratio of visible light) of the carbon nanotube film 10 can be related to the thickness and the density of the carbon nanotube film 10. The larger the thickness and density of the carbon nanotube film 10 are, the lower the light transmittance of the carbon nanotube film is. Further, the light transmittance of the carbon nanotube film 10 also can be related to the number of the carbon nanotubes 100 between the carbon nanotube strings 102 and the distance between the adjacent carbon nanotube strings 102. The larger the distance between the carbon nanotube strings 102 and the fewer the number of the carbon nanotubes 100 between the carbon nanotube strings 102, the higher the light transmittance of the carbon nanotube film 10. The light transmittance of the carbon nanotube film 10 can be in a range from about 60% to about 95%. Referring to FIG. 7, in the present embodiment, when the thickness of the carbon nanotube film 10 is about 50 nanometers, the light transmittance of the carbon nanotube film 10 before being stretched is in a range from about 67% to about 82%. If deformation of the carbon nanotube film 10 along the second direction D2 is 120%, the light transmittance of the carbon nanotube film 10 is in a range from about 84% to about 92%. Using green light with a wavelength of 550 nanometers as an example, green light transmittance of the carbon nanotube film 10 before being stretched is about 78%. If deformation of the carbon nanotube film 10 along the second direction D2 is about 120%, the green light transmittance of the carbon nanotube film 10 increases to about 89%.

Since the carbon nanotube film 10 can be stretched along the second direction D2, the carbon nanotube film 10 can be used in elastic and tensible elements/equipments. The carbon nanotube film 10 after being stretched has a high light transmittance, and can be used in a device requiring high light transmittance, such as touch panels.

Figure 5:
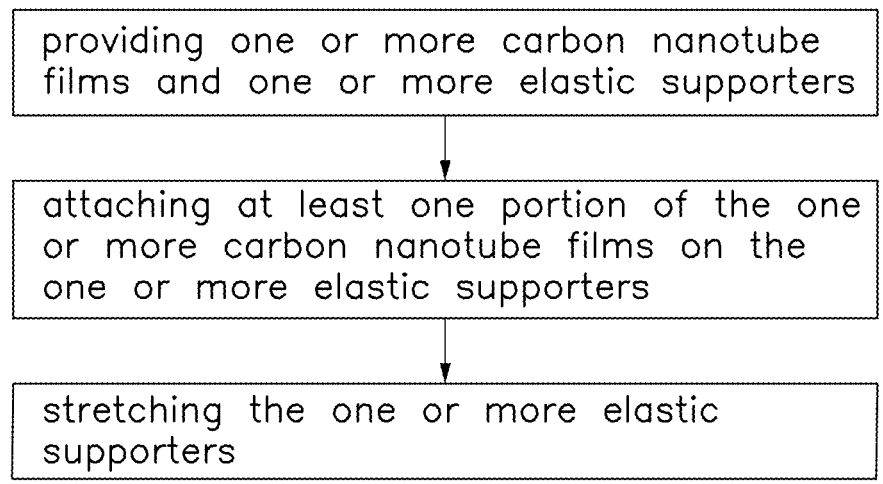
FIG. 5 is a flow chart of one embodiment of a method for stretching the carbon nanotube film.
Figure 6:
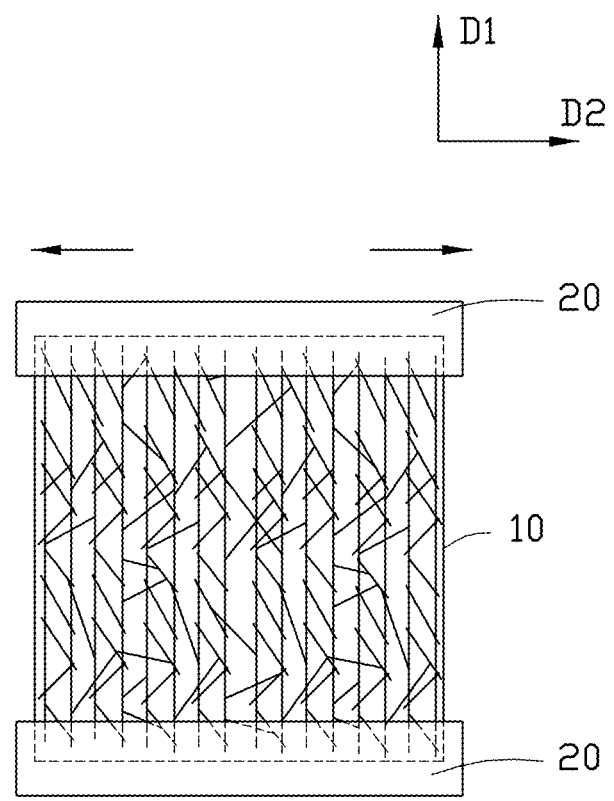
FIG. 6 is a schematic view of the carbon nanotube film stretched.

Referring to FIGS. 5 and 6, a method for stretching the carbon nanotube film 10 is provided. The method includes: (a) providing one or more carbon nanotube films 10 and one or more elastic supporters 20; (b) attaching at least one portion of the one or more carbon nanotube films 10 to the one or more elastic supporters 20; and (c) stretching the one or more elastic supporters 20.

In step (a), the method for making the carbon nanotube films 10 includes: (a1) providing an array of carbon nanotubes; (a2) pulling out a carbon nanotube film from the array of carbon nanotubes using a tool (e.g., adhesive tape, pliers, tweezers, or another tool allowing multiple carbon nanotubes to be gripped and pulled simultaneously).

In step (a1), the array of carbon nanotubes can be formed by conventional methods such as chemical vapor deposition methods, arc-discharge methods, and laser ablation methods. In the present embodiment, the array of carbon nanotubes can be formed by the chemical vapor deposition method. The array of carbon nanotubes can be a super-aligned array of carbon nanotubes. The carbon nanotubes are grown on a substrate substantially perpendicular to the substrate.

In step (a2), the carbon nanotube film can be formed by: (a21) selecting one or more carbon nanotubes having a predetermined width from the array of carbon nanotubes; and (a22) pulling the carbon nanotubes to form nanotube segments at an even/uniform speed to achieve a uniform carbon nanotube film.

Figure 3:
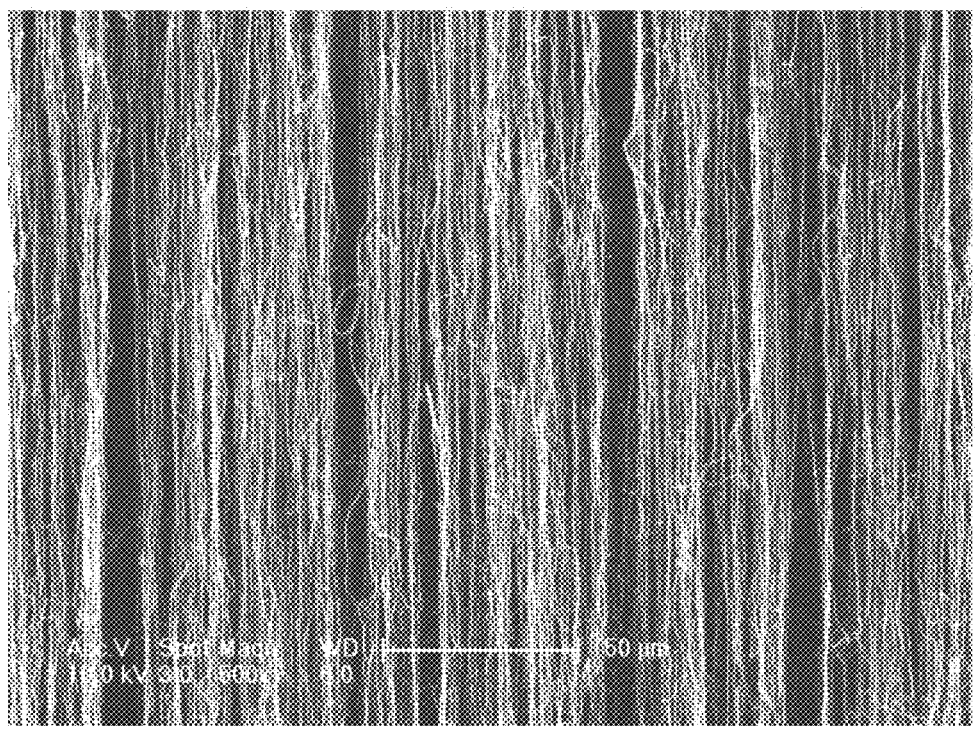
FIG. 3 is a Scanning Electron Microscope (SEM) image of a carbon nanotube film before being stretched.

In step (a21), the carbon nanotube segment includes a plurality of carbon nanotubes substantially parallel to each other. The carbon nanotube segments can be selected using an adhesive tape as a tool to contact the array of carbon nanotubes. In step (a22), the pulling direction can be substantially perpendicular to the growing direction of the array of carbon nanotubes. It is to be understood that some variation can occur in the orientation of the nanotubes in the film as can be seen in FIG. 3. FIG. 3 is a Scanning Electron Microscope (SEM) image of a carbon nanotube film before being stretched.

More specifically, during the pulling process, as the initial carbon nanotube segments are drawn out, other carbon nanotube segments are also drawn out end to end due to van der Waals attractive force between ends of adjacent carbon nanotube segments. This drawing process ensures a substantially continuous and uniform carbon nanotube film being formed. The carbon nanotube film 10 includes a plurality of carbon nanotube strings 12, and a plurality of carbon nanotubes 100 located between adjacent carbon nanotube strings 12.

A shape and a structure of the elastic supporters 20 are not limited. The elastic supporters 20 can have a planar structure or a curved structure. The elastic supporters 20 can be elastic rubber elements, springs, or elastic bands. The elastic supporters 20 can be used to support and stretch the carbon nanotube film 10. Specifically, the elastic supporters 20 can be stretched along the second direction D2.

In step (b), the one or more carbon nanotube films 10 can be directly attached to and contacted with a surface of the elastic supporters 20 if the elastic supporters 20 have a planar surface, such as if the elastic supporters are elastic rubber. The one or more carbon nanotube films 10 also can be partly attached to and contacted with the surface of the elastic supporters 20, for example, placed between two separately placed elastic supporters 20, such as springs, and elastic bands. Since the carbon nanotubes have a large specific area, the carbon nanotube film 10 is adhesive and can be adhered directly on the elastic supporters 20. Further, it can be understood that the carbon nanotube film 10 can be better adhered on the elastic supporters 20 with an adhesive. Two or more carbon nanotube films 10 can also be stacked along a substantially same direction to form a multi-layer carbon nanotube film. The carbon nanotube strings 102 in the adjacent two carbon nanotube films 10 of the multi-layer carbon nanotube film are arranged along a same direction. The multi-layer carbon nanotube film has a larger thickness than one single carbon nanotube film 10, thus, it can be understood that the deformation of the multi-layer carbon nanotube film can be larger than that of one single carbon nanotube film 10.

In the present embodiment, the two elastic supporters 20 are two springs. One carbon nanotube film 10 is attached to the two elastic supporters 20. Referring to FIG. 6, the two elastic supporters 20 are separately located and substantially parallel to each other. The two elastic supporters 20 are arranged along the second direction D2. Two ends of the carbon nanotube film 10 along the first direction D1 are secured on the two elastic supporters 20 by an adhesive. The carbon nanotube strings 102 in the carbon nanotube film 10 can extend from one elastic supporter 20 to the other elastic supporter 20.

In step (c), the elastic supporters 20 can be fixed on a stretching device (not shown). The stretching device is used to stretch the elastic supporters 20. In one embodiment, the two elastic supporters 20 are fixed on the stretching device.

The stretching velocity depends on the carbon nanotube film 10. The stretching velocity cannot be too large, otherwise the carbon nanotube film 10 may break. The stretching velocity can be less than 10 centimeters per second (cm/s). In one embodiment, the stretching velocity is about 2 cm/s.

The stretching direction is closely related to the arranged direction of the carbon nanotube strings 102 of the carbon nanotube film 10. The stretching direction is generally perpendicular to the arranged direction of the carbon nanotube strings 102, e.g., along the second direction D2.

Since the one or more carbon nanotube films 10 are secured on the elastic supporters 20, if the elastic supporters 20 are uniformly stretched along the second direction D2, the one or more carbon nanotube films 10 are also stretched along the same direction. In the carbon nanotube film 10, during the stretching process, the carbon nanotubes 100 located between the carbon nanotube strings 102 and the carbon nanotube strings 102 maintain contact with each other and the distance between the carbon nanotube strings 102 is increased, because the carbon nanotubes in the carbon nanotube strings 102 are joined end to end, and the carbon nanotubes 100 between the carbon nanotube strings 102 are contacted with two or more carbon nanotube strings 102 located side by side by van der Waals attractive force therebetween. The distance between the carbon nanotube strings 102 before being stretched can be in a range from about 0 micrometers to about 10 micrometers. The distance between the carbon nanotube strings 102 after being stretched can reach to about 50 micrometers. The carbon nanotube film 10 maintains a film structure during the stretching process.

If two or more carbon nanotube films 10 are stacked with each other to form a multi-layer carbon nanotube film, the carbon nanotubes 100 in the multi-layer carbon nanotube film have a more uniform distribution and a higher density, thus the multi-layer carbon nanotube film have a high deformation.

Figure 4:
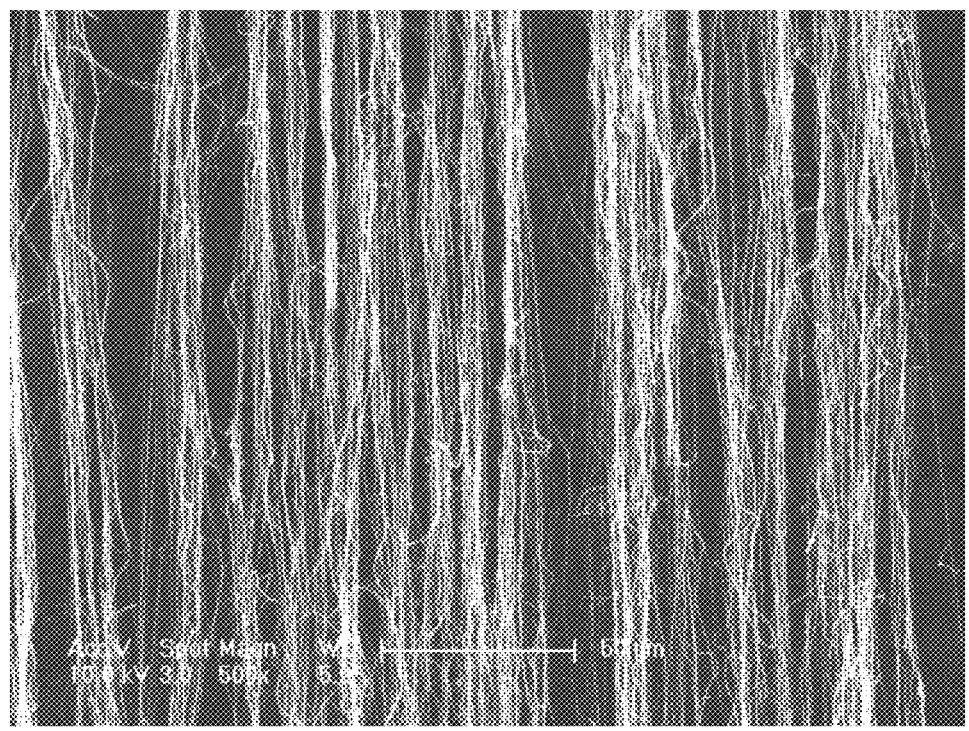
FIG. 4 is a Scanning Electron Microscope (SEM) image of a carbon nanotube film after being stretched.

The deformation of the carbon nanotube film 10 along the second direction D2 can be up to approximately 300%. In one embodiment, the deformation of the carbon nanotube film 10 along the second direction D2 can be in a range from about 25% to 150%. FIG. 4 is a SEM image of a carbon nanotube film 10 after being stretched/deformed 120%. Comparing to FIG. 3, the distance between the carbon nanotube strings 102 after stretching is greater than that before being stretched. Referring to FIG. 7, if deformation of the carbon nanotube film 10 is about 120%, the light transmittance of the carbon nanotube film 10 is in a range from about 84% to about 92%, to light having a wavelength ranging from about 190 nanometers to about 900 nanometers. Electrical resistance of the carbon nanotube film 10 before and after being stretched is almost the same.

Further, if deformation of the carbon nanotube film 10 is less than about 60%, the distance between the carbon nanotube strings 102 along the second direction D2 can reach about 20 micrometers. The carbon nanotube film 10 after being stretched can return to an original non-stretched size upon release of the stretching force. The stretching properties of the carbon nanotube film may be widely used where elasticity and resilience of carbon nanotubes would be useful in consumer electronics and other devices.

The carbon nanotube film and the stretching method thereof have a plurality of merits including the following. Firstly, the carbon nanotube film can be stretched by placing one or more carbon nanotube films on one or more elastic supporters and stretching the one or more elastic supporters. This method is simple and has a low cost. Secondly, the carbon nanotube film has a high light transmittance after being stretched, thereby avoiding using complicated methods and expensive instruments, such as laser instruments, to treat the carbon nanotube film to increase the light transmittance thereof. The carbon nanotube film can be used in a device requiring a high light transmittance, such as touch panels. Thirdly, the stretching properties of the carbon nanotube film can be widely used in stretchable consumer electronics and other devices. Lastly, it is conducive to use the method for stretching the carbon nanotube film to acquire a large area carbon nanotube film. The carbon nanotube film is not limited to the size of a substrate on which a carbon nanotube array is grown, the carbon nanotube film being drawn from the carbon nanotube array. The carbon nanotube film can be used in large scale devices.

Figure 8:
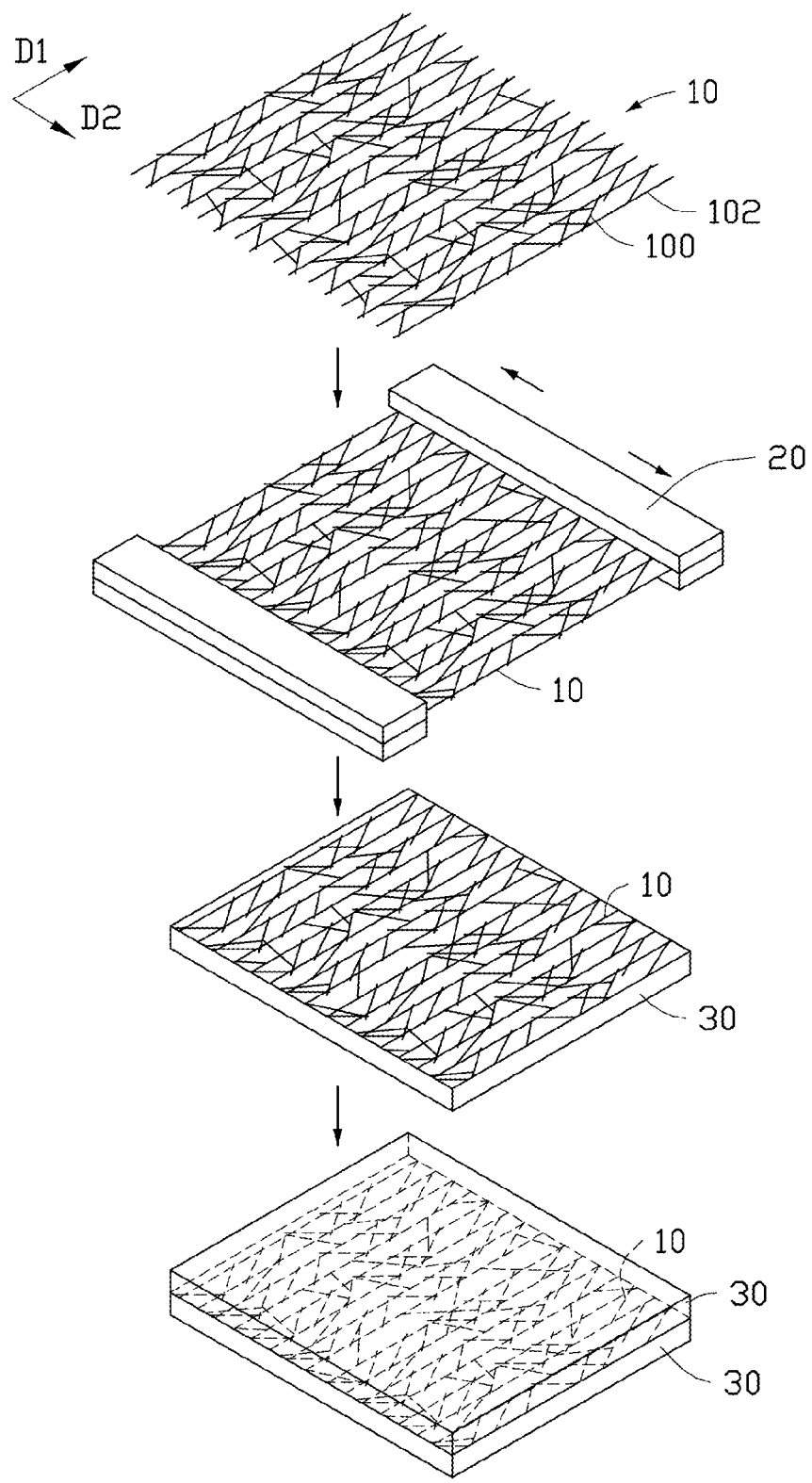
FIG. 8 is a flow chart of one embodiment of a method for laying the carbon nanotube film.
Figure 9:
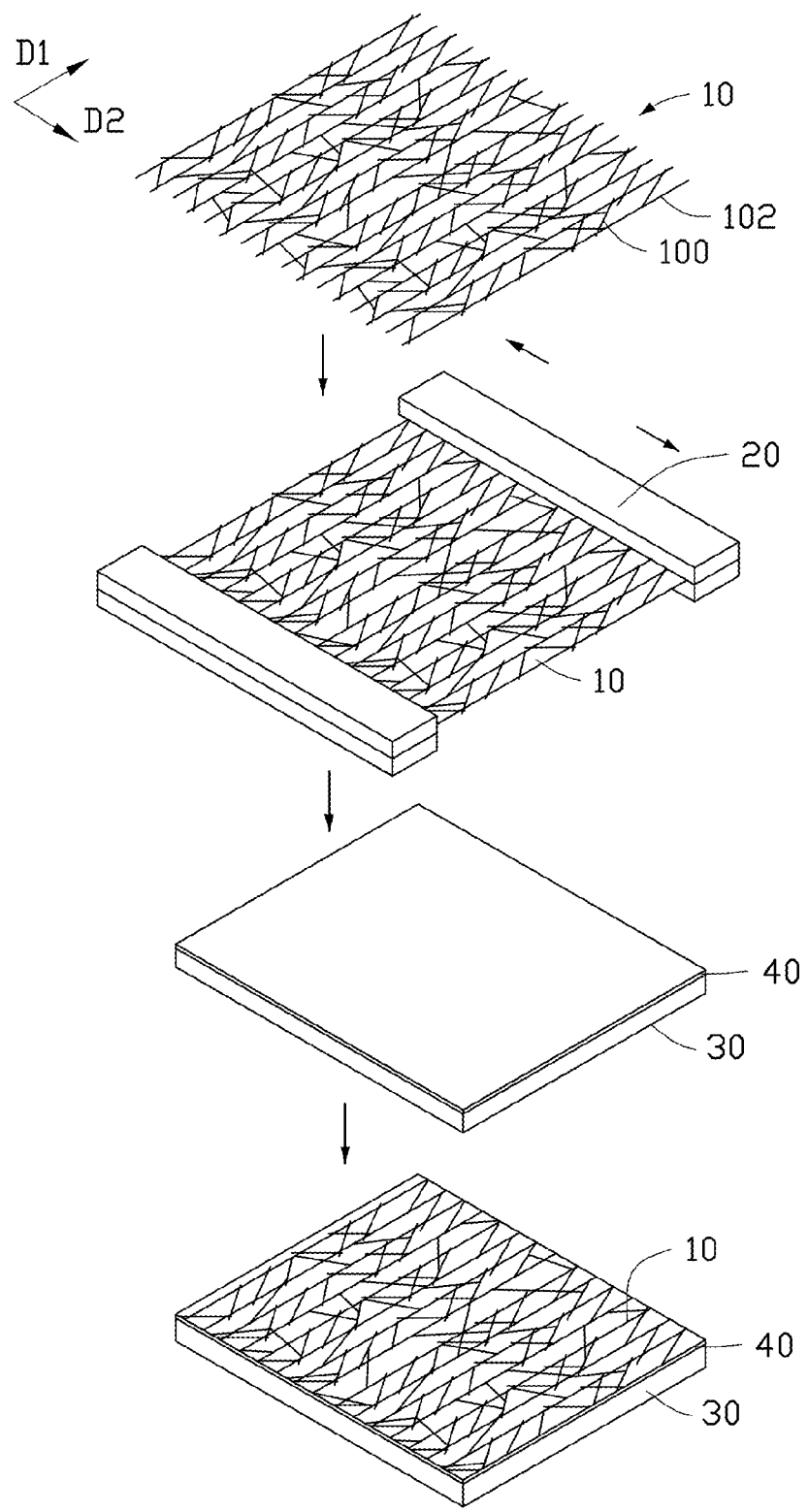
FIG. 9 is a flow chart of one embodiment of a method for laying the carbon nanotube film.
Figure 10:
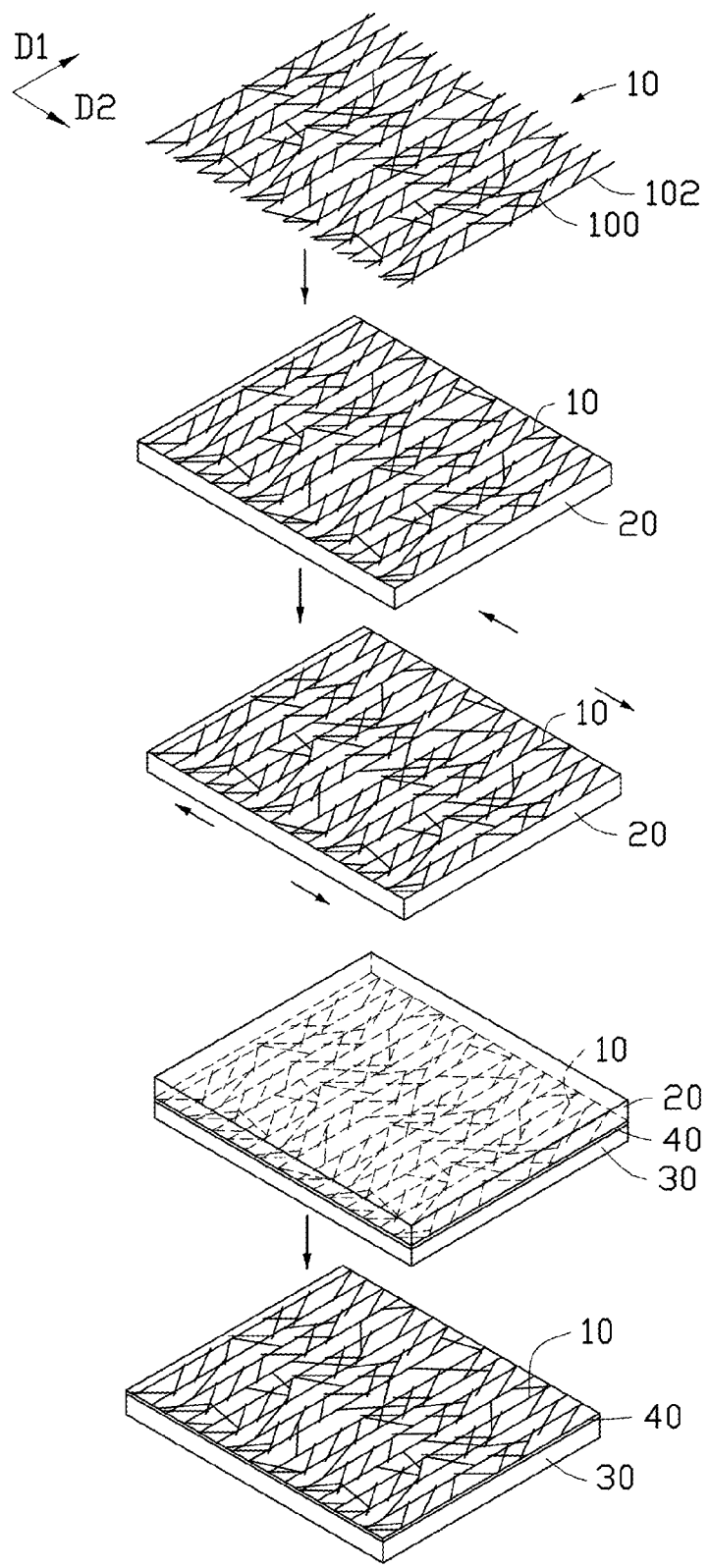
FIG. 10 is a flow chart of one embodiment of a method for laying the carbon nanotube film.

Referring to FIGS. 8-10, a method for laying the carbon nanotube film 10 is provided. The method includes: (a) providing a carbon nanotube film 10 including a plurality of carbon nanotube strings 102 substantially parallel to each other and extending along a first direction; (b) stretching the carbon nanotube film 10 along a second direction substantially perpendicular with the first direction to form a deformation along the second direction; (c) placing the carbon nanotube film 10 on a surface of a substrate 30; and (d) keeping the deformation along the second direction.

In step (a), the carbon nanotube film 10 is made by pulling from the carbon nanotube array via the method provided above. Each carbon nanotube string 102 includes a plurality of carbon nanotubes joined end to end. The carbon nanotubes in the carbon nanotube string 102 are substantially aligned along an axis of the carbon nanotube string 102, and attracted by van der Waals attractive force therebetween. The carbon nanotube film 10 further includes a plurality of carbon nanotubes 100 located between adjacent carbon nanotube strings 102 and in contact with at least two adjacent carbon nanotube strings 102.

In step (b), the carbon nanotube film 10 is stretched through one or more elastic supporters 20. The elastic supporters 20 can be elastic rubber elements, springs, or elastic bands. The elastic supporters 20 can be elastically stretched along the second direction. In one embodiment, the carbon nanotube film 10 is attached to two parallel elastic supporters 20 extending along the second direction and stretched by drawing the two parallel elastic supporters 20 along the second direction as shown in FIGS. 8-9. The carbon nanotube film 10 can be directly attached on the two elastic supporters 20 by inherent adhesive properties of the carbon nanotube film 10. The carbon nanotube film 10 can be attached on the two elastic supporters 20 via an adhesive. After attached to the two parallel elastic supporters 20, the portion of the carbon nanotube film 10 that is between the two parallel elastic supporters 20 is suspended, and the plurality of carbon nanotube strings 102 substantially extend from one of the two elastic supporters 20. The two parallel elastic supporters 20 can be elastically drawn along the second direction at a velocity of less than 10 centimeters per second. The elastic supporters 20 can be removed after step (c). The deformation of the carbon nanotube film 10 along the second direction can reach up to about 300%. In one embodiment, the deformation along the second direction can be in a range from about 25% to 150%.

In one embodiment, the carbon nanotube film 10 is attached to a single elastic supporter 20 as shown in FIG. 10. The elastic supporter 20 can be an elastic rubber film with an area equal to or greater than the area of the carbon nanotube film 10. After attached to the single elastic supporter 20, the entire carbon nanotube film 10 stacks with the single elastic supporter 20. Thus, the entire carbon nanotube film 10 can be stretched uniformly.

In step (c), the carbon nanotube film 10 is located on the substrate 30 directly. The shape, the size and the material of the substrate 30 are not limited. The substrate 30 can be flat or curved. The substrate 30 can be transparent or opaque. The substrate 30 can be electric insulative or conductive. The substrate 30 can be made of rigid materials such as glass, quartz, diamond, plastic, ceramic, metal, silicon or any other suitable material. The substrate 30 can also be made of flexible materials such as polycarbonate (PC), polymethyl methacrylate acrylic (PMMA), polyimide (PI), polyethylene terephthalate (PET), polyethylene (PE), polyether polysulfones (PES), polyvinyl polychloride (PVC), benzocyclobutenes (BCB), polyesters, or acrylic resin. In one embodiment, the substrate 30 is a flat and flexible PET plate.

In step (d), keeping the deformation along the second direction can be performed by any suitable method. In one embodiment, the deformation along the second direction is kept by melting and solidifying the substrate 30. In one embodiment, the deformation along the second direction is kept by sandwiching the carbon nanotube film 10 between two substrates 30 as shown in FIG. 8. In one embodiment, an adhesive layer 40 is coated on the substrate 30, and the deformation along the second direction is kept by fixing the carbon nanotube film 10 on the substrate 30 via the adhesive layer 40 as shown in FIGS. 9-10.

When the carbon nanotube film 10 is fixed on the substrate 30 via the adhesive layer 40, most of the carbon nanotubes 100 of the carbon nanotube film 10 are embedded in the adhesive layer 40. The adhesive layer 40 can be transparent and can be made of materials such as hot plastic or UV (Ultraviolet Rays) glue, for example PVC or PMMA. The thickness of the adhesive layer 40 can be in a range from about 1 nanometer to about 500 micrometers, for example, the thickness is in a range from about 1 micrometer to about 2 micrometers. In one embodiment, the adhesive layer 40 is a UV glue layer with a thickness of 1.5 micrometers.

When the carbon nanotube film 10 is directly attached on the elastic supporter 20 by inherent adhesive properties of the carbon nanotube film 10, because inherent adhesive force of the carbon nanotube film 10 is weaker than an adhesive force of the adhesive layer 40, the elastic supporter 20 can be easily removed and recycled after the carbon nanotube film 10 is fixed on a substrate 30 by the adhesive layer 40.

The method of laying carbon nanotube film can be widely used in the process of making any suitable device having carbon nanotube film such as a liquid crystal display (LCD), a field emission display (FED), or a touch panel.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for laying carbon nanotube film, the method comprising:
   (a) providing a carbon nanotube film comprising a plurality of carbon nanotube strings substantially parallel to each other and extending along a first direction;
   (b) stretching the carbon nanotube film along a second direction substantially perpendicular with the first direction to form a deformation of the carbon nanotube film along the second direction, wherein step (b) comprises the substeps of:
      (b1) attaching the carbon nanotube film on two elastic supporters parallel with and spaced from each other, and extending along the second direction, wherein the plurality of carbon nanotube strings substantially extend from one of the two elastic supporters to the other one, and a portion of the carbon nanotube film between the two elastic supporters is suspended after the carbon nanotube film is attached to the two elastic supporters; and (b2) stretching the two elastic supporters along the second direction;

(c) placing the carbon nanotube film with the deformation on a surface of a substrate; and (d) keeping the deformation along the second direction.

2. The method of claim 1, wherein the carbon nanotube film is directly drawn from a carbon nanotube array.

3. The method of claim 1, wherein the carbon nanotube film further comprises a plurality of carbon nanotubes located between adjacent carbon nanotube strings and in contact with at least two adjacent carbon nanotube strings.

4. The method of claim 1, wherein two or more carbon nanotube films are stacked with each other to form a multilayer structure.

5. The method of claim 1, wherein each of the two elastic supporters is selected from the group consisting of a spring, an elastic rubber, and an elastic band.

6. The method of claim 1, wherein the carbon nanotube film is directly attached on the two elastic supporters by inherent adhesive properties of the carbon nanotube film.

7. The method of claim 1, wherein the carbon nanotube film is attached on the two elastic supporters via an adhesive.

8. The method of claim 1, wherein the two parallel elastic supporters are elastically drawn along the second direction.

9. The method of claim 1, wherein the two parallel elastic supporters are drawn along the second direction at a velocity of less than 10 centimeters per second.

10. The method of claim 1, wherein the deformation of the carbon nanotube film along the second direction is less than about 300% of the original non-stretched size of the carbon nanotube film.

11. The method of claim 1, wherein the deformation of the carbon nanotube film along the second direction in a range from about 25% to about 150% of the original non-stretched size of the carbon nanotube film.

12. The method of claim 1, wherein the substrate is made of a material selected from the group consisting of glass, quartz, diamond, polymer, ceramic, metal, and silicon.

13. The method of claim 1, wherein in step (d), the deformation along the second direction is kept by melting and solidifying the substrate.

14. The method of claim 1, wherein in step (d), the deformation along the second direction is kept by sandwiching the carbon nanotube film between two substrates.

15. The method of claim 1, wherein in step (d), the deformation along the second direction is kept by fixing the carbon nanotube film on the substrate via an adhesive layer.

16. A method for laying carbon nanotube film, the method comprising:

(a) drawing a carbon nanotube film from a carbon nanotube array along a first direction;

(b) stretching the carbon nanotube film along a second direction substantially perpendicular with the first direction to obtain a stretched carbon nanotube film, wherein step (b) comprises the substeps of:

(b1) attaching the carbon nanotube film on two elastic supporters parallel with and spaced from each other, and extending along the second direction, wherein a portion of the carbon nanotube film between the two elastic supporters is suspended after the carbon nanotube film is attached to the two elastic supporters; and (b2) stretching the two elastic supporters along the second direction; and (c) fixing the stretched carbon nanotube film on a surface of a substrate.

* * * * *